July 3, 1923.
N. C. DIVELBISS
AUTOMOBILE BRAKE
Filed March 1, 1920
1,460,892
2 Sheets-Sheet 1
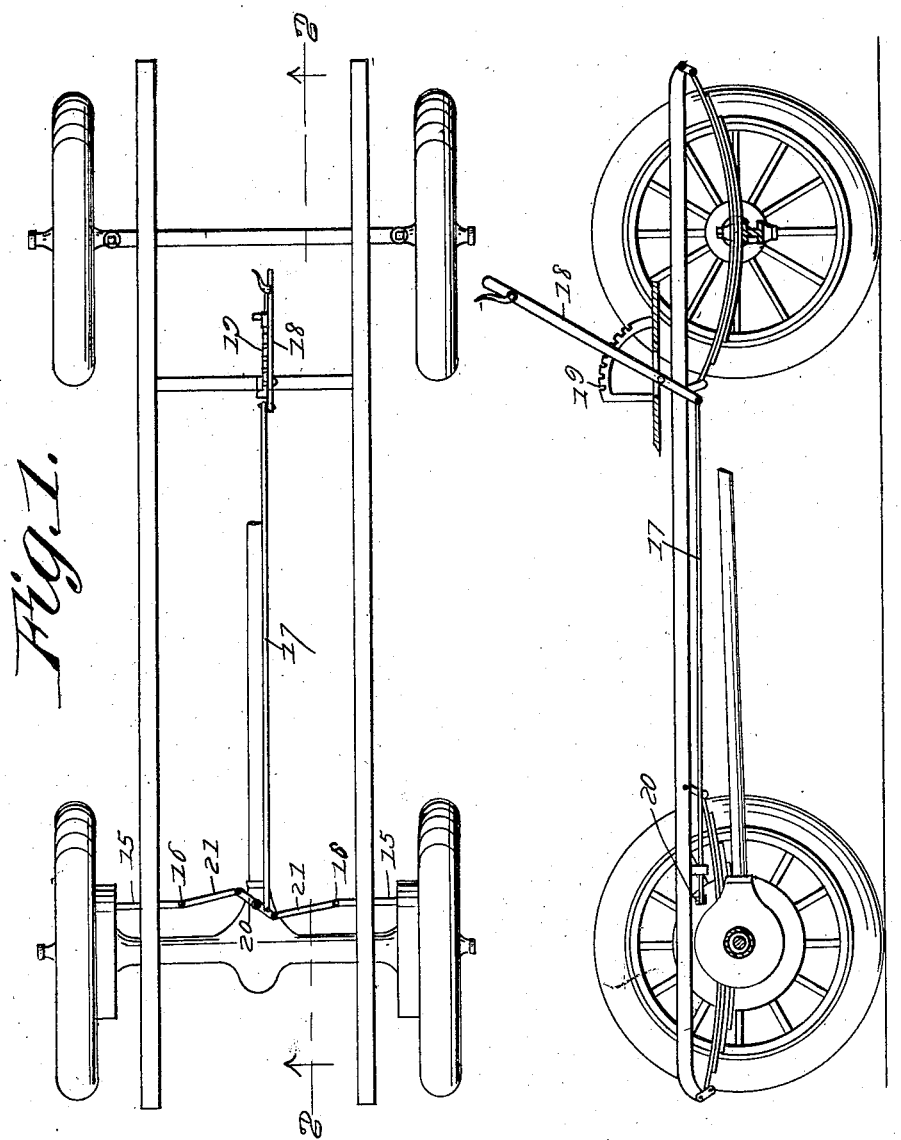
Inventor
N. C. Divelbiss,
By
Attorney July 3, 1923.
N. C. DIVELBISS
AUTOMOBILE BRAKE
Filed March 1, 1920
1,460,892
2 Sheets-Sheet 2
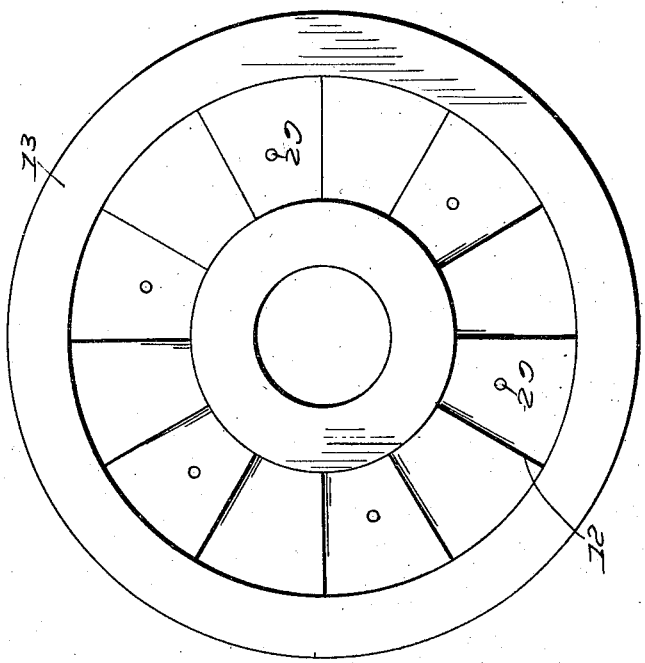
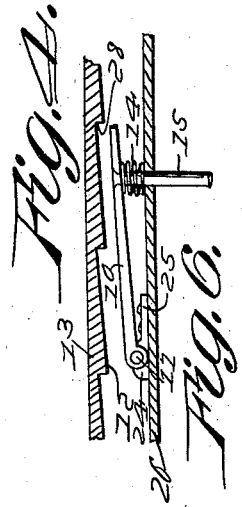
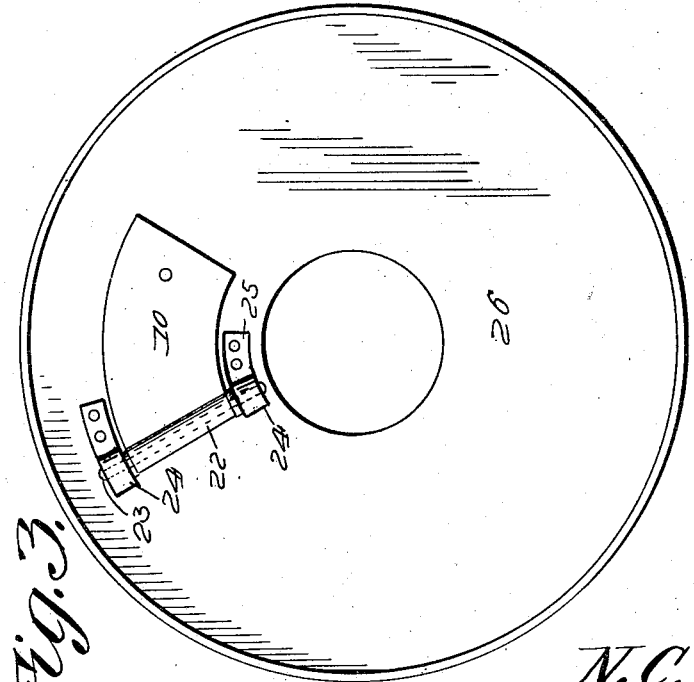
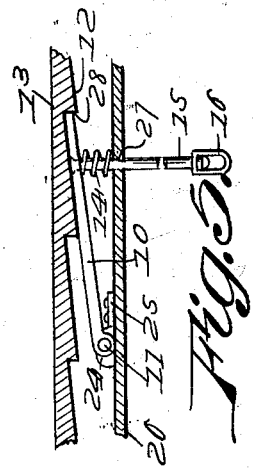
Inventor
N. C. Divelbiss,
By
Attorney Patented July 3, 1923.

1,460,892

UNITED STATES PATENT OFFICE.

NEWTON C. DIVELBISS, OF SAN FRANCISCO, CALIFORNIA.

AUTOMOBILE BRAKE.

Application filed March 1, 1920. Serial No. 362,450.

*To all whom it may concern:*

Be it known that NEWTON C. DIVELBISS, a citizen of the United States of America, residing at San Francisco, in the county of San Francisco and State of California, has invented new and useful Improvements in Automobile Brakes, of which the following is a specification.

The object of the invention is to provide a simple and efficient brake for automobiles and similar vehicles and in that connection more especially to provide a means for locking the car against retrograde movement, the construction of the brake proper being such as to adapt it for application to machines of any or all of the commercial types with only such necessary modifications as may be required in the means for actuating the same to suit the arrangements of the running gears of such cars, and with this object in view the invention consists in a construction and combination of parts of which a preferred embodiment is shown in the accompanying drawings, wherein:

Figure 1 is a plan view showing the arrangement of the brake mechanism with reference to the driving wheels and indicating a typical form of means for actuating the same.

Figure 2 is a side view of the same.

Figure 3 is a face view of the brake casing.

Figure 4 is a face view of the hub plate.

Figures 5 and 6 are detail sectional views of the lock mechanism respectively in engaged and disengaged positions.

The brake consists essentially of a tongue 10 fulcrumed as at 11 and terminally adapted for engagement with the serrated surfaces 12 of a hub plate 13 adapted to be carried by the driving wheel, said tongue being yieldingly impelled toward its engaging relation with the hub plate by a spring 14 and being actuable by a rod 15 having a swivel 16 with which may be connected any suitable operating devices adapted for the type of car in connection with which the brake mechanism is to be used.

In the drawing there is shown merely for illustrative purposes an operating mechanism consisting of a tension rod 17 actuable by a brake lever 18 provided with suitable locking means 19, a lever 20 with which said tension rod is connected, and links 21 extending from the lever to the operating rods 15, but it will be understood that said connections are subject to variation to suit the preferences of the design or the builder of the car or the type or construction of the running gear of the car and therefore constitutes no essential part of the present invention.

The tongue 10 is of segmental form with its extremity adjacent to the pivotal mounting thereof provided with a sleeve 22 through which extends the pivot pin 23 engaged in eyes 24 formed in straps 25 riveted or otherwise rigidly secured to a casing plate 26 forming the inner wall of a housing for the brake mechanism and accessible only through the guide opening 27 formed for the passage of the operating rod 15, so that the face of the serrated hub plate 13 is protected from accumulations of dust and other foreign matter.

When the operating rod is actuated to cause contact of the tongue with the serrated surface the side thereof comes into contact with the beveled faces of the serrations while after the wheels have reached a state of rest the extremity of the tongue will bear against an offset or abrupt shoulder 28 and thus positively lock the wheel and therefore the car against backward or retrograde movement.

It will be understood that the brake may be readily applied to cars of any type in that it does not involve any modification in the usual construction of the wheels or the parts directly related therewith. The hub plate can be attached to the hub by means of bolts or screws extending, for example, through openings 29 provided in the hub plate and the flange of the casing plate 26 fitting over the hub plate serves to protect the tongue and the serrated surface of the hub plate and maintain the same indefinitely in proper condition for effecting the object for which the device is designed.

What is claimed is:—

1. A vehicle brake having a hub plate provided with an annular series of serrations consisting of alternate beveled and offset faces arranged on radial lines, a pivotal tongue of segmental form provided with a radial terminal for contact with said beveled faces and engaged with said shoulders, and means for actuating the tongue.

2. A vehicle brake having a serrated hub plate consisting of alternate beveled faces and offset shoulders arranged on radial lines, a casing plate covering said hub plate, a segmental tongue pivotally mounted upon the casing plate with its free end disposed on a radial line in operative relation with the serrated face of the hub plate, and means for actuting the tongue.

3. A vehicle brake having a serrated hub plate consisting of alternate beveled faces and offset shoulders arranged on radial lines, a casing plate covering said hub plate, a segmental tongue pivotally mounted upon the casing plate with its free end disposed on a radial line in operative relation with the serrated face of the hub plate, and means for actuating the tongue, including a spring for impelling the free end of the tongue toward said serrated face, and an actuating rod connected with the tongue and provided exteriorly of the casing plate with an attaching swivel.

In testimony whereof he affixes his signature.

NEWTON C. DIVELBISS.